US012624749B2

(12) United States Patent
Matczak

(10) Patent No.: US 12,624,749 B2
(45) Date of Patent: May 12, 2026

(54) LINEAR ACTUATOR WITH TRANSLATING SCREW AND TORQUE TUBE

(71) Applicant: Thomson Industries, Inc., Marengo, IL (US)

(72) Inventor: Michael Frank Matczak, Mayfield Heights, OH (US)

(73) Assignee: Thomson Industries, Inc., Marengo, IL (US)

( * ) Notice: Subject to any disclaimer, the term of this patent is extended or adjusted under 35 U.S.C. 154(b) by 50 days.

(21) Appl. No.: 18/819,531

(22) Filed: Aug. 29, 2024

(65) Prior Publication Data

US 2026/0063188 A1      Mar. 5, 2026

(51) Int. Cl.
*F16H 25/20* (2006.01)
*F16H 25/22* (2006.01)
*F16H 25/24* (2006.01)

(52) U.S. Cl.
CPC ..... *F16H 25/2209* (2013.01); *F16H 25/2454* (2013.01); *F16H 2025/2075* (2013.01)

(58) Field of Classification Search
CPC ..................... F16H 25/2454; F16H 2025/2075
See application file for complete search history.

(56) References Cited

U.S. PATENT DOCUMENTS

| | | | | |
|---|---|---|---|---|
| 3,327,826 A | * | 6/1967 | Henschke | F16K 31/047 |
| | | | | 74/89.34 |
| 6,081,051 A | | 6/2000 | Kitazawa et al. | |

| | | | | |
|---|---|---|---|---|
| 6,659,219 B2 | * | 12/2003 | Okada | H02K 7/06 |
| | | | | 180/444 |
| 10,465,776 B2 | * | 11/2019 | Nagatsuka | F16H 25/20 |
| 2014/0144263 A1 | | 5/2014 | Yoshioka et al. | |
| 2016/0208894 A1 | | 7/2016 | Nagatsuka et al. | |

FOREIGN PATENT DOCUMENTS

| | | | | |
|---|---|---|---|---|
| EP | 4180693 A1 | | 5/2023 | |
| GB | 2459297 A | * | 10/2009 | F16H 25/20 |
| JP | 6373637 B2 | | 7/2018 | |
| JP | 2023-070350 A | | 5/2023 | |

(Continued)

OTHER PUBLICATIONS

English (machine) translation of JP 6373637 B2.

(Continued)

*Primary Examiner* — Gregory Robert Weber
(74) *Attorney, Agent, or Firm* — Reising Ethington P.C.

(57) ABSTRACT

A compact linear actuator having a long stroke is provided. An actuator housing houses a motor having a tubular shaft and a ball nut, both of which are rotatable about an axis. The motor shaft and ball nut are axially spaced and a torque transfer assembly transfers torque from the motor shaft to the ball nut. The assembly includes a torque transfer tube having a first axial end coupled to the motor shaft and a second axial end coupled to a coupling between the tube and ball nut. A ball screw extends through at least a portion of the motor shaft, the tube and the ball nut and outward from the housing and moves along the axis responsive to rotation of the ball nut. The coupling is axially spaced from, and configured for movement along the axis relative to, the tube to prevent transfer of axial loads to the tube.

20 Claims, 3 Drawing Sheets

(56)     References Cited

FOREIGN PATENT DOCUMENTS

KR     20-2013-0004796  U     8/2013

OTHER PUBLICATIONS

English (machine) translation of JP 2023-070350 A.
English (machine) translation of KR 20-2013-0004796 U.
International Search Report issued in corresponding International
(PCT) Patent Application No. PCT/US2025/038030 (Oct. 17, 2025).
Written Opinion issued in corresponding International (PCT) Patent
Application No. PCT/US2025/038030 (Oct. 17, 2025).

* cited by examiner

LINEAR ACTUATOR WITH TRANSLATING SCREW AND TORQUE TUBE

BACKGROUND OF THE INVENTION a. Field of the Invention

This disclosure relates to a linear actuator. In particular, the disclosure relates to a linear actuator that has a relatively long stroke, but is also relatively compact.

b. Background Art

Linear actuators convert rotary motion into linear motion to move an object back and forth along a line. Linear actuators are used in a wide variety of applications and the form of the linear actuator will vary depending on the requirements of the application. One of the primary variables that is considered when designing or selecting a linear actuator for a particular application is the stroke length of the actuator (i.e., the distance that the rod of the actuator will travel when moved from a fully retracted position to a fully extended position and from the fully extended position to the fully retracted position). The length of the rod, and therefore, the linear actuator, will be at least as long as the stroke length. The length of the linear actuator, however, is often much greater than the stroke length. In particular, the motor of the linear actuator and power transmission devices that are used to transfer power from the motor to the rod will add to the length of the actuator—particularly in an inline arrangement in which the motor output shaft is coaxial with the rod. In some linear actuators, the length of the actuator is reduced using a parallel arrangement in which the motor output shaft is parallel to the rod. This arrangement, however, significantly expands the width of the linear actuator.

Certain applications require a relatively long stroke length, but also require that the actuator have a relatively small size (i.e., a relatively small length and width). For example, forklifts used to move objects from one location to another include a mast at a forward end. The mast includes a pair of outer rails and a pair of inner rails that may be moved relative to the outer rails. The inner rails support a carriage on which a load backrest and forks are mounted to support objects that are being moved. The inner rails, carriage, load backrest, forks and objects are typically raised and lowered using hydraulic cylinders. Replacing the hydraulic cylinders with an electric linear actuator would eliminate significant maintenance issues associated with the use of hydraulic cylinders. For certain types of forklifts, however, the potential height of the mast is limited and, therefore, the potential size of the linear actuator is also limited. For example, for forklifts that are used to load and unload trailers of tractor-trailers, the potential height of the mast is limited by the height of the trailer interior. As a result, the available space in the mast for a linear actuator is also limited. When the forklift is used to move objects outside of the trailer (e.g., to place or remove objects from storage locations in a building), however, a relatively long stroke length may still be needed to move objects to and from an appropriate location.

The inventors herein have recognized a need for a linear actuator that will minimize and/or eliminate one or more of the above-identified deficiencies.

BRIEF SUMMARY OF THE INVENTION

This disclosure relates to a linear actuator. In particular, the disclosure relates to a linear actuator that has a relatively long stroke, but is also relatively compact.

A linear actuator in accordance with one embodiment includes a housing, a motor disposed within the housing and having a tubular motor shaft configured for rotation about an axis and a ball nut disposed within the housing and configured for rotation about the axis. The ball nut is axially spaced from the motor shaft. The linear actuator further includes a torque transfer assembly configured to transfer torque from the motor shaft to the ball nut. The torque transfer assembly includes a torque transfer tube configured for rotation about the axis and having first and second axial ends. The first axial end is coupled to the motor shaft for rotation therewith. The torque transfer assembly further includes a coupling between the second axial end of the torque transfer tube and the ball nut. The coupling is configured for rotation with the ball nut and the torque transfer tube. The linear actuator further includes a ball screw extending through at least a portion of the motor shaft, the torque transfer tube and the ball nut and outward from the housing. The ball screw is configured for movement along the axis in response to rotation of the ball nut. The coupling is configured for movement along the axis relative to the torque transfer tube in the presence of a load applied to the ball screw in the direction of the axis.

A linear actuator in accordance with another embodiment includes a housing, a motor disposed within the housing and having a tubular motor shaft configured for rotation about an axis and a ball nut disposed within the housing and configured for rotation about the axis. The ball nut is axially spaced from the motor shaft. The linear actuator further includes a torque transfer assembly configured to transfer torque from the motor shaft to the ball nut. The torque transfer assembly includes a torque transfer tube configured for rotation about the axis and having first and second axial ends. The first axial end is coupled to the motor shaft for rotation therewith. The torque transfer assembly further includes a coupling between the second axial end of the torque transfer tube and the ball nut. The coupling is configured for rotation with the ball nut and the torque transfer tube. The linear actuator further includes a ball screw extending through at least a portion of the motor shaft, the torque transfer tube and the ball nut and outward from the housing. The ball screw is configured for movement along the axis in response to rotation of the ball nut. A first radially extending surface formed in an axial end of one of torque transfer tube and the coupling faces a second radially extending surface of the other of the torque transfer tube and the coupling and the first and second radially extending surfaces are axially spaced from one another by an air gap.

A linear actuator in accordance with the present teachings is advantageous relative to conventional linear actuators. The linear actuator has a relatively long stroke, but is relatively compact in both length and width thereby enabling use of the actuator in applications, such as forklifts used in the loading and unloading of tractor-trailers, that require an actuator that is small enough to fit within a relatively small space, but that also has a long stroke.

The foregoing and other aspects, features, details, utilities, and advantages of the present teachings will be apparent from reading the following description and claims, and from reviewing the accompanying drawings.

DETAILED DESCRIPTION OF EMBODIMENTS OF THE INVENTION

Figure 1:
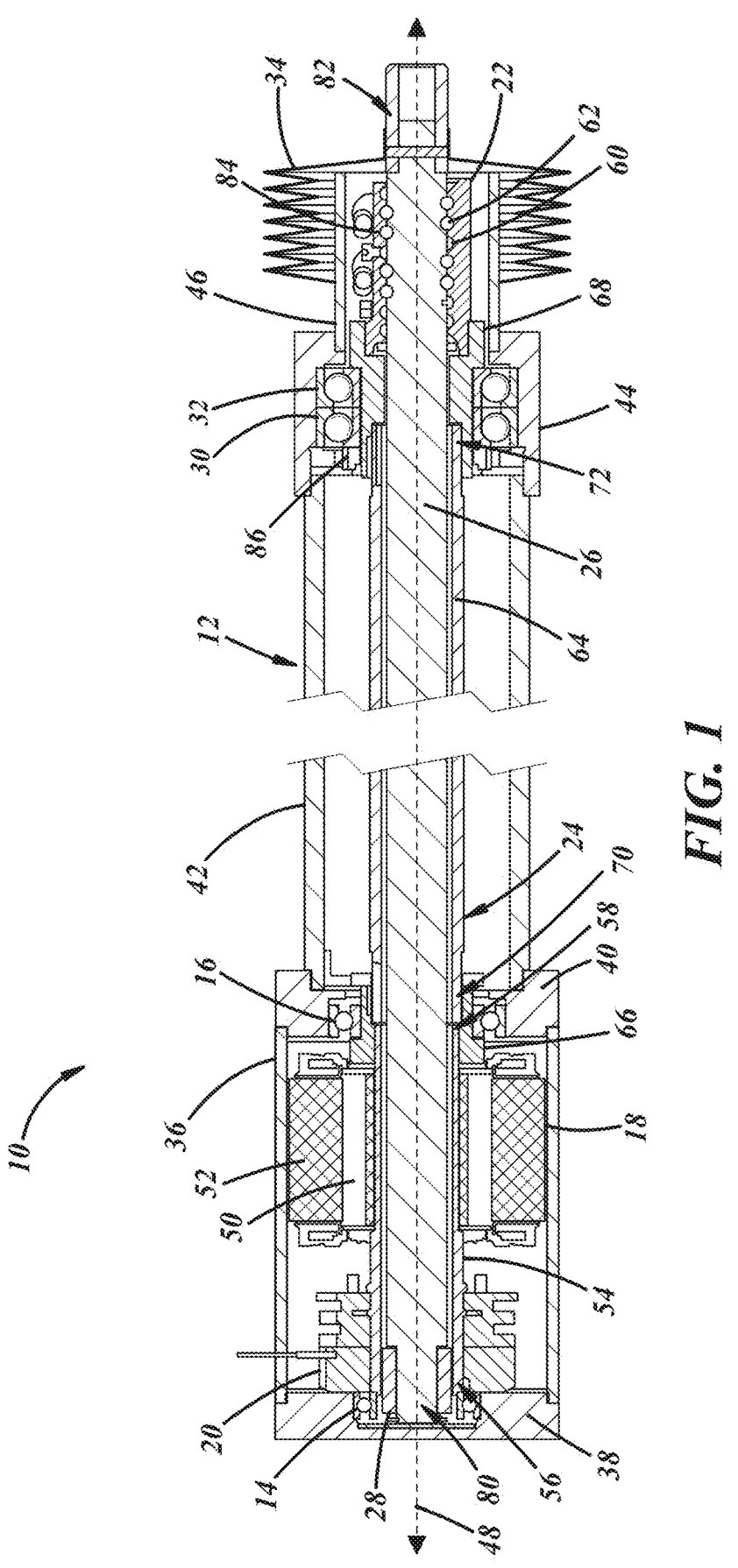
FIG. 1 is a cross-sectional view of a linear actuator in accordance with the teachings herein in a full retracted position.
Figure 2:
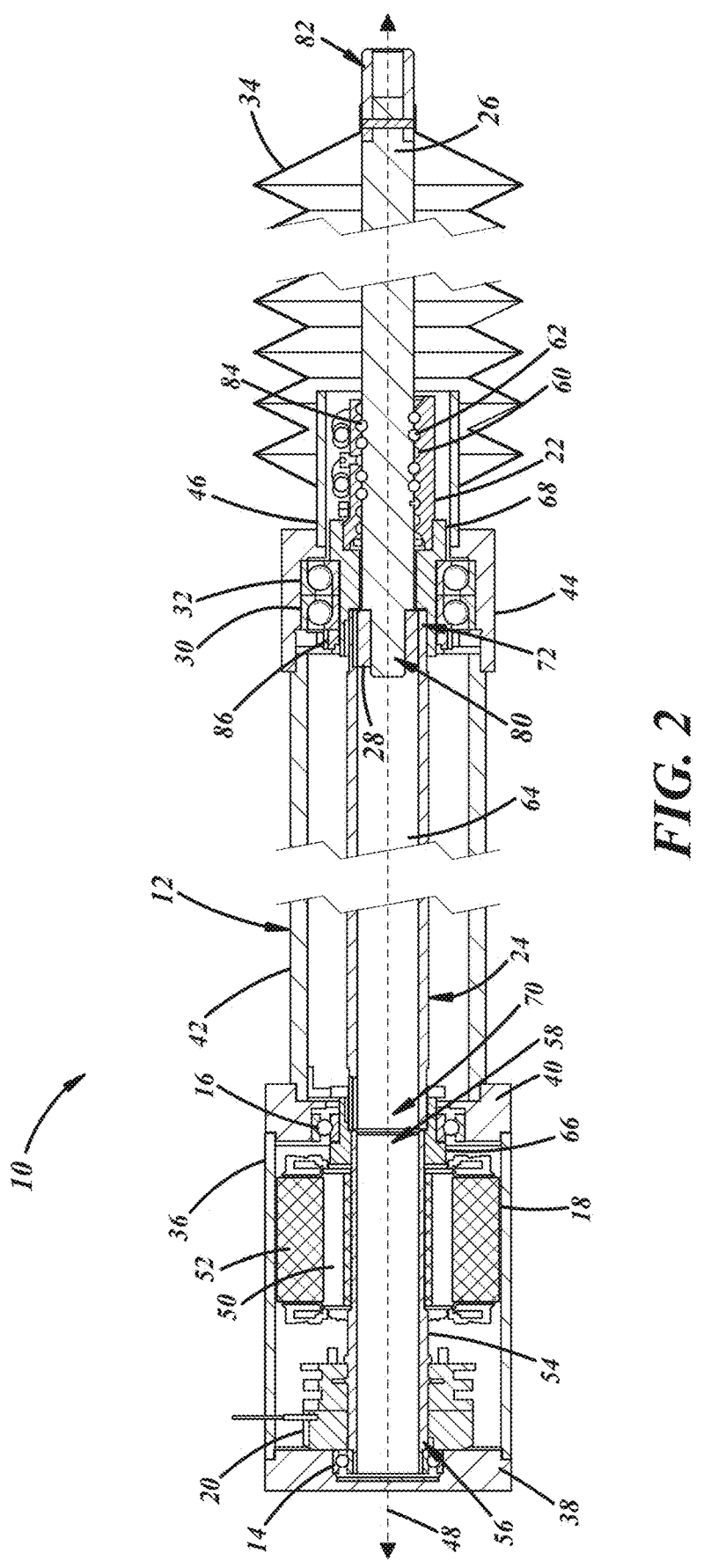
FIG. 2 is a cross-sectional view of a linear actuator in accordance with the teachings herein in a full extended position.

Referring now to the drawings wherein like reference numerals are used to identify identical components in the various views, FIGS. 1-2 illustrate a linear actuator 10 in accordance with the teachings herein. Linear actuator 10 is provided to move an object or load in a linear direction. In one application, linear actuator 10 is intended for use in the mast of a forklift and, in particular, to raise and lower the inner rails, carriage, load backrest and forks of the forklift. It should be understood, however, that linear actuator 10 may be used in a wide variety of applications in which an object or load is being moved in a linear direction. Linear actuator 10 includes a housing 12, bearings 14, 16, a motor 18, a brake 20, a ball nut 22 a torque transfer assembly 24, a ball screw 26, a bushing 28, bearings 30, 32 and a bellows 34.

Housing 12 is provided to position and orient the other components of linear actuator 10 and to protect those components from external objects and elements. Housing 12 may be made from a variety of materials including metals and metal alloys. Housing # may include multiple housing members 36, 38, 40, 42, 44, 46 that are coupled together using conventional fasteners.

Member 36 defines an interior space sized to receive and house motor 18 and brake 20. Member 36 is annular in shape and may be disposed about, and centered about, an axis 48 extending through linear actuator 10 and along which ball screw 26 translates.

Member 38 is disposed at one axial end of member 36 and defines a first endbell configured to support bearing 14. Member 38 may be disposed about, and centered about, axis 48 and closes one end of the interior space defined by member 36. Member 38 may be configured for coupling to another structure (not shown) to position and orient linear actuator 10 within its operating environment.

Member 40 is disposed at the opposite axial end of member 36 and defines a second endbell configured to support bearing 16. Member 40 is annular in shape and may be disposed about, and centered about, axis 48. Member 40 defines a central aperture through which portions of motor 18 and torque transfer assembly 22 extend and through which ball screw 26 extends when linear actuator 10 is in a partially or fully retracted position as described in greater detail below.

Member 42 is configured to receive and house a portion of torque transfer assembly 24 as described in more detail below. When linear actuator 10 is partially or fully retracted, at least a portion of ball screw 26 will be disposed within member 42 as shown in FIG. 1. Member 42 is annular in shape and may be disposed about, and centered about, axis 48. Member 42 extends axially between member 40 and member 44.

Member 44 is configured to receive a portion of torque transfer assembly 24 and bearings 30, 32. As discussed in more detail below, member 44 is also is configured to transfer axial loads from ball screw 26 to other members of housing 12. Member 44 is annular in shape and may be disposed about, and centered about, axis 48. Member 44 extends axially between member 42 and member 46.

Member 46 is configured to receive and house ball nut 22 and provides a means for mounting bellows 34. Member 46 is annular in shape and may be disposed about, and centered about, axis 48. Member 46 extends axially from member 44. One axial end of member 46 is coupled to member 44 while the opposite axial end of member 46 defines an opening through which ball screw 26 is extended and retracted from housing 12.

Bearings 14, 16 allow components of motor 18 and torque transfer assembly 24 to rotate relative to housing 12. Bearings 14, 16 may comprise ball or roller bearings. Bearing 14 is sized to be received within member 38 of housing 12 with an outer race sandwiched axially between a shoulder in member 38 and brake 20 and an inner race supported on a shaft of motor 18 for rotation therewith. Bearing 16 is sized to be received within member of housing 40 with an outer race engaging a shoulder formed in member 40 and an inner race supported on a portion of torque transfer assembly 24 for rotation therewith.

Motor 18 is provided to generate a torque and related force used to cause movement of ball screw 26 along axis 48 and move ball screw 26 and linear actuator 10 between a fully retracted position (FIG. 1) and fully extended position (FIG. 2). Motor 18 may comprise a conventional alternating current (AC) or direct current (DC) motor. Motor 18 is disposed within housing 12 and, in particular, member 36 of housing 12. Motor 18 includes a conventional stator 50 and hollow bore rotor 52. Motor 50 further includes a tubular output shaft or motor shaft 54 coupled to rotor 50 for rotation therewith and configured to receive ball screw 26 and bushing 28 therein. Motor shaft 54 is disposed about, and may be centered about, axis 48 and is configured for rotation about axis 48. Motor shaft 54 extends outward in each axial direction from rotor 50. One axial end 56 of motor shaft 54 is disposed on one side of rotor 50 and extends through brake 20 and contacts the inner race of bearing 14. The other axial end 58 of motor shaft 54 is disposed on the other side of rotor 50 and may extend partially through member 40 of housing 12 and is configured for coupling to torque transfer assembly 24 as described in more detail below.

Brake 20 is provided to apply a braking torque to motor shaft 54 and thereby maintain a linear position of ball screw 26. Brake 20 may, for example, comprise a spring-set, electromagnetically released brake. Brake 20 is disposed within housing 12 and, in particular, within member 36 of housing 12 and may abut member 38 of housing 12. Brake 20 is configured to receive end 56 of motor shaft 54 and is disposed about end 56 of motor shaft 54. Brake 20 is further configured to receive ball screw 26 and bushing 28 when linear actuator 10 is in a fully retracted position.

Ball nut 22 transmits torque from torque transfer assembly 24 to ball screw 26. Ball nut 22 is disposed within member 46 of housing 12 and is axially spaced from motor shaft 54. Ball nut 22 is configured for rotation about axis 48 and includes an annular body that is disposed about, and may be centered about, axis 48. One axial end of the body is configured for coupling to a component of torque transfer assembly 24 as described in more detail below. A radially inner surface of the body defines a plurality of threads 60 forming an outer race for a plurality of bearing balls 62 disposed between ball nut 22 and ball screw 26. The body further defines one or more pathways for recirculating the bearing balls 62 between different axial positions and threads 60 on the body as ball screw 26 is translated along axis 48.

Torque transfer assembly 24 transfers torque from motor shaft 54 to ball nut 22 allowing ball nut 22 to be axially spaced from motor shaft 54 and, as a result, enabling a relatively long stroke length for ball screw 26 and linear actuator 10. Assembly 24 includes a torque transfer tube 64 and couplings 66, 68.

Figure 3:
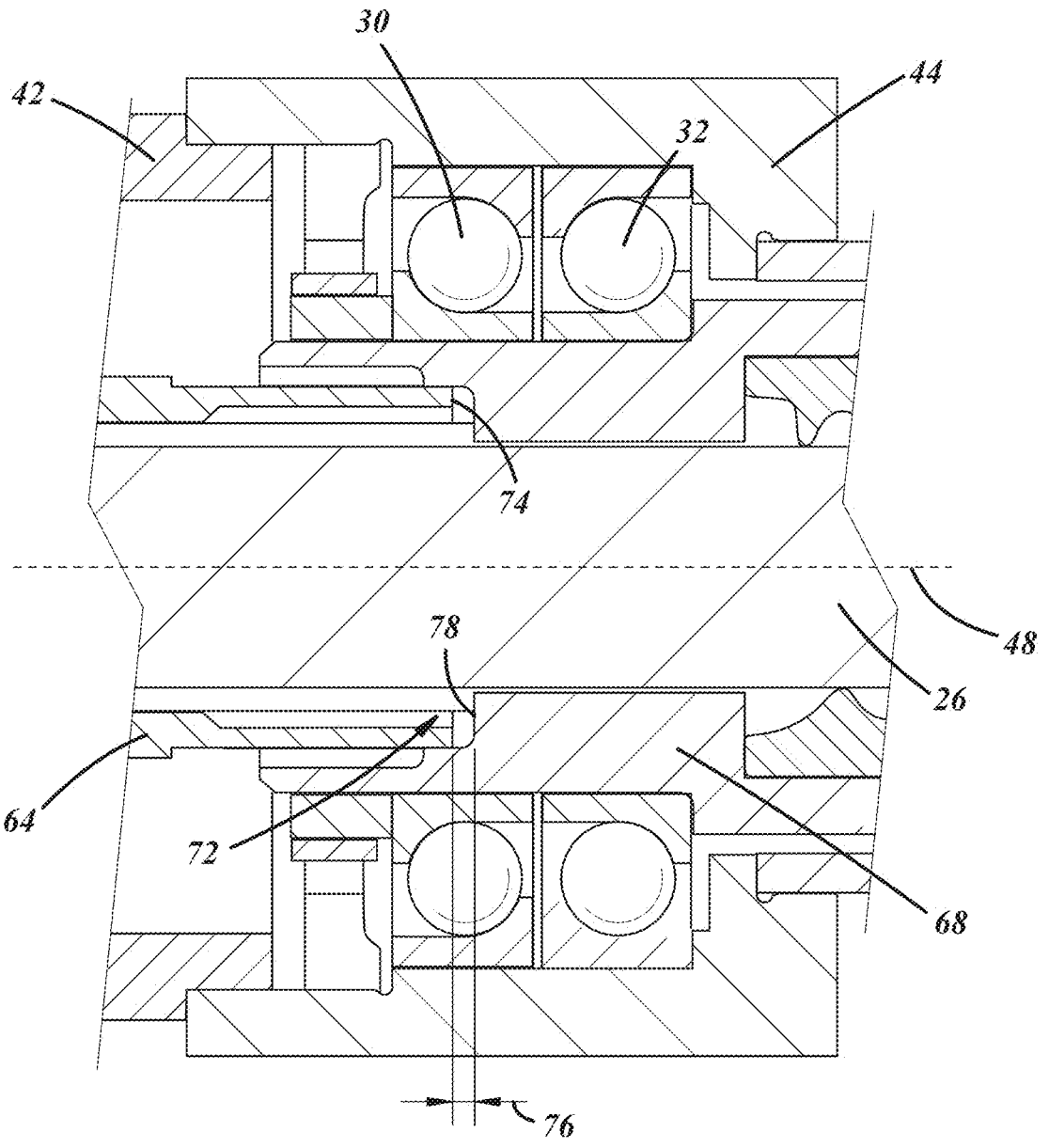
FIG. 3 is an enlarged view of a portion of FIG. 1.

Torque transfer tube 64 transmits torque from motor shaft 54 to ball nut 22. Tube 64 is disposed within member 42 of housing 12. Tube 64 is annular in shape. Tube 64 is disposed about, and may be centered about, axis 48 and is configured for rotation about axis 48. Tube 64 is sized to receive ball screw 26 and bushing 28 therein and to allow movement of ball screw 26 and bushing 28 along axis 26 between fully retracted and fully extended positions as tube 64 rotates about axis 48. One axial end 70 of tube 64 is configured for coupling to end 58 of motor shaft 54, through coupling 66, for rotation with motor shaft 54. The other axial end 72 of tube 64 is configured for coupling to ball nut 22, through coupling 68. A radially outer surface of each axial end 70, 72 of tube 64 may, for example, define a key configured to be received within a corresponding keyway in a radially inner surface of each coupling 66, 68 or a keyway configured to receive a corresponding key in a radially inner surface of each coupling 66, 68 or one or more splines configured for engagement with corresponding splines in a radially inner surface of each coupling 66, 68, Referring to FIG. 3, end 72 of tube 64 defines a radially extending surface 74 that is axially spaced from coupling 68 by an air gap 76 for a purpose described below.

Referring again to FIGS. 1-2, coupling 66 is disposed between motor shaft 54 and torque transfer tube 64 and couples end 58 of motor shaft 54 to end 70 of torque transfer tube 64. Coupling 66 is configured for rotation with motor shaft 54 and torque transfer tube 64 and transmits torque from motor shaft 54 to torque transfer tube 64. Coupling 66 is disposed within members 36, 40 of housing 12 and is supported for rotation relative to housing 12 by bearing 16. Coupling 66 is annular in shape and is disposed about, and may be centered about, axis 48. An outer diameter of coupling 66 varies along an axial length of coupling 66 to define a shoulder abutting one side of an inner race of bearing 16. A radially inner surface of coupling 66 is configured for engagement with end 54 of motor shaft 54 and 70 of torque transfer tube 64. The radially inner surface of coupling 66 may, for example, define keys configured to be received within corresponding keyways in radially outer surfaces of motor shaft 54 and torque transfer tube 64 or keyways configured to receive corresponding keys in radially outer surfaces of motor shaft 54 and torque transfer tube 64 or one or more splines configured for engagement with corresponding splines in radially outer surfaces of motor shaft 54 and torque transfer tube 64. Rotation of motor shaft 54 causes corresponding rotation of coupling 66 and, through coupling 66, torque transfer tube 64 about axis 48.

Coupling 68 transmits torque from end 72 of torque transfer tube 64 through coupling 68 to ball nut 22. Coupling 68 is disposed with members 44, 46 of housing 12 and is supported for rotation relative to housing 12 by bearings 30, 32. Coupling 68 is annular in shape and is disposed about, and may be centered about, axis 48. An outer diameter of coupling 68 varies along an axial length of coupling 68 to define a shoulder abutting one side of an inner race of bearing 32. An inner diameter of coupling 68 also varies along the axial length of coupling 68 to define shoulders proximate end 72 of torque transfer tube 64 and an axial end of the body of ball nut 22. A radially inner surface of coupling 68 is configured for engagement with end 72 of torque transfer tube 64 and the end of ball nut 22. The radially inner surface of coupling 68 may, for example, define keys configured to be received within corresponding keyways in radially outer surfaces of torque transfer tube 64 and ball nut 22 or keyways configured to receive corresponding keys in radially outer surfaces of torque transfer tube 64 and ball nut 22 or one or more splines configured for engagement with corresponding splines in radially outer surfaces of torque transfer tube 64 and ball nut 22. Coupling 68 is configured for rotation with torque transfer tube 64 and ball nut 22. In particular, rotation of torque transfer tube 64 causes corresponding rotation of coupling 68 and, through coupling 68, ball nut 22 about axis 48. In accordance with one aspect of the teachings disclosed herein, coupling 68 is configured for rotation with torque transfer tube 64, but is also configured for movement along axis 48 relative to torque transfer tube 64 in the presence of a load applied to ball screw 26 in the direction of the axis 48. Referring again to FIG. 3, coupling 68 defines a radially extending surface 78 that faces or opposes surface 74 in torque transfer tube 64, but is axially spaced from surface 74 by air gap 76. In the illustrated embodiment, surface 74 is formed at the end of torque transfer tube 64 whereas surface 78 is formed inward from the end of coupling 68. It should be understood, however, that this configuration could be reversed by adjusting the shapes of torque transfer tube 64 and coupling 68 such that surfaces 74, 78 are instead formed inward from the end of torque transfer tube 64 and at the end of coupling 68. The axial spacing between radially extending surfaces 74, 78 in torque transfer tube 64 and coupling 68 allows coupling 68 to move axially towards torque transfer tube 64 in the presence of axial loads acting on ball screw 26 and through ball nut 22 and coupling 68 without transferring those loads to torque transfer tube 64 and, ultimately, to motor shaft 54.

Referring again to FIGS. 1-2, ball screw 26 moves an object or load along axis 48 as ball screw 26 is extended or retracted from housing 12 of linear actuator 10. Ball screw 26 is sized to be received within motor shaft 54, torque transfer tube 64, couplings 66, 68 and ball nut 22. Ball screw 26 is disposed about, and may be centered about, axis 48. One axial end 80 of ball screw 26 is sized to be received within bushing 28. The other axial end 82 of ball screw 26 is configured to engage the object or load. It will be understood that the shape of end 82 of ball screw 26 will vary depending on the nature of the object or load. A radially outer surface of ball screw 26 defines a plurality of threads 84 forming an inner race for bearing balls 62 disposed between ball nut 22 and ball screw 26. Rotation of ball nut 22 causes, through the engagement of threads 60, 84 and bearing balls 62, translational movement of ball screw 26 along axis 48. In accordance with one aspect of the teachings herein, ball screw 26 extends through the elements of torque transfer assembly 24 (i.e., torque transfer tube 64 and couplings 66, 68) and ball nut 22 and outward from housing 12. Ball screw 26 further extends through motor 18—extending through at least a portion of motor shaft 54 and, in the illustrated embodiment, the entire length of motor shaft 54. Further, ball screw 26 may extend through at least a portion of, and in the illustrated embodiment, the entire length of brake 20. As a result, ball screw 26 and linear actuator 10 are configured with a relatively long stroke, but linear actuator 10 is also relatively compact. In particular, none of the bearings 14, 16, motor 18 or brake 20 add to the length of linear actuator 10 and the stroke length of linear actuator 10 is nearly the same as the length of liner actuator 10.

Bushing 28 is provided to support ball screw 26 within motor shaft 54 and torque transfer tube 64 and allow ball screw 26 to move along axis 48 relative to motor shaft 54 and torque transfer tube 64. Bushing 28 supports end 80 of ball screw 26 and is disposed within motor shaft 54 when liner actuator 10 is in a fully retracted position. Bushing 28 has an inner diameter sized to receive end 80 of ball screw 26 and an outer diameter sized to be received within motor shaft 54 and torque transfer tube 64.

Bearings 30, 32 support coupling 68 for rotation relative to member 44 of housing 12. In accordance with one aspect of the teachings disclosed herein, however, bearings 30, 32 also transfer axial loads on ball screw 26 into housing 12. Bearings 30, 32 comprise angular contact bearings. Bearings 30, 32 are disposed radially between housing 12 and coupling 68. An outer race of each bearing 30, 32 is in engagement with a radially inner surface of member 44 of housing 12. An inner race of each bearing 30, 32 is in engagement with a radially outer surface of coupling 68. Bearings 30, 32 are retained axially between a shoulder formed in coupling 68 and a stop ring 86 affixed to one end of coupling 68. When axial loads impose a force on ball screw 26 urging ball screw 26 further inward into housing 12, the force is transferred through ball nut 22, coupling 68 and bearings 30, 32 into housing 12 (and ultimately, into the surrounding structure on which linear actuator 10 is mounted). This arrangement of bearings 30, 32 as well as the spacing between the radial surfaces 74, 78 of torque transfer tube 64 and coupling 68 discussed above, prevent these axial loads form being transferred to torque transfer tube 64 and, ultimately, motor shaft 54 thereby reducing the risk of damage to motor 18.

Bellows 34 is provided to prevent dust and other contaminants from entering housing 12 during of movement of ball screw 26 between the fully retracted and fully extended positions. Bellows 34 may be made from a variety of flexible materials including, certain metals, plastics and rubber. One end of bellows 34 is coupled to ball screw 26 proximate end 82 of ball screw 26. The other end of bellows 34 is coupled to member 46 of housing 12 such that the end of bellows 34 is radially aligned with ball nut 22. When linear actuator 10 is in a fully retracted position (FIG. 1), bellows 34 is in a fully contracted state. When linear actuator 10 is in a fully extended position (FIG. 2), bellows 34 is in a fully extended state.

A linear actuator 10 in accordance with the present teachings is advantageous relative to conventional linear actuators. The linear actuator 10 has a relatively long stroke, but is relatively compact in both length and width thereby enabling use of the actuator 10 in applications, such as forklifts used in the loading and unloading of tractor-trailers, that require an actuator that is small enough to fit within a relatively small space, but that also has a long stroke.

While the invention has been shown and described with reference to one or more particular embodiments thereof, it will be understood by those of skill in the art that various changes and modifications can be made without departing from the spirit and scope of the invention.

I claim:

1. A linear actuator, comprising:
a housing;
a motor disposed within the housing and having a tubular motor shaft configured for rotation about an axis;
a ball nut disposed within the housing and configured for rotation about the axis, the ball nut axially spaced from the motor shaft;

a torque transfer assembly configured to transfer torque from the motor shaft to the ball nut, the torque transfer assembly including
a torque transfer tube configured for rotation about the axis and having first and second axial ends, the first axial end coupled to the motor shaft for rotation therewith; and,
a first coupling positioned axially between the second axial end of the torque transfer tube and the ball nut, the first coupling configured for rotation with the ball nut and the torque transfer tube; and,
a ball screw extending through at least a portion of the motor shaft and through the torque transfer tube and the ball nut and outward from the housing, the ball screw configured for movement along the axis in response to rotation of the ball nut
wherein the first coupling is configured for movement along the axis relative to the torque transfer tube in response to a load applied to the ball screw in the direction of the axis.

2. The linear actuator of claim 1, further comprising an angular contact bearing disposed between the housing and the first coupling, the angular contact bearing and first coupling disposed in a radial plane extending perpendicular to the axis.

3. The linear actuator of claim 1 wherein the ball screw extends through an entire length of the motor shaft.

4. The linear actuator of claim 1, further comprising a bushing disposed within the motor shaft and supporting a first axial end of the ball screw.

5. The linear actuator of claim 1, further comprising a brake disposed within the housing and configured to apply a braking torque to the motor shaft.

6. The linear actuator of claim 5 wherein the motor shaft includes first and second axial ends, the first axial end of the motor shaft coupled to the first axial end of the torque transfer tube and the brake disposed about the second axial end of the motor shaft.

7. The linear actuator of claim 1, further comprising a bellows having a first end coupled to the housing and a second end coupled to the ball screw.

8. The linear actuator of claim 7 wherein the first end of the bellows and the ball nut are disposed in a radial plane extending perpendicular to the axis.

9. The linear actuator of claim 1, further comprising a second coupling between the first axial end of the torque transfer tube and the motor shaft, the second coupling configured for rotation with the motor shaft and the torque transfer tube.

10. A linear actuator, comprising:
a housing;
a motor disposed within the housing and having a tubular motor shaft configured for rotation about an axis;
a ball nut disposed within the housing and configured for rotation about the axis, the ball nut axially spaced from the motor shaft;
a torque transfer assembly configured to transfer torque from the motor shaft to the ball nut, the torque transfer assembly including
a torque transfer tube configured for rotation about the axis and having first and second axial ends, the first axial end coupled to the motor shaft for rotation therewith; and,
a first coupling between the second axial end of the torque transfer tube and the ball nut, the first coupling configured for rotation with the ball nut and the torque transfer tube; and, a ball screw extending through at least a portion of the motor shaft, the torque transfer tube and the ball nut and outward from the housing, the ball screw configured for movement along the axis in response to rotation of the ball nut wherein the first coupling is configured for movement along the axis relative to the torque transfer tube in the presence of a load applied to the ball screw in the direction of the axis and further comprising a brake disposed within the housing and configured to apply a braking torque to the motor shaft wherein the ball screw extends through at least a portion of the brake.

11. A linear actuator, comprising:

a housing;

a motor disposed within the housing and having a tubular motor shaft configured for rotation about an axis;

a ball nut disposed within the housing and configured for rotation about the axis, the ball nut axially spaced from the motor shaft;

a torque transfer assembly configured to transfer torque from the motor shaft to the ball nut, the torque transfer assembly including a torque transfer tube configured for rotation about the axis and having first and second axial ends, the first axial end coupled to the motor shaft for rotation therewith; and, a first coupling between the second axial end of the torque transfer tube and the ball nut, the first coupling configured for rotation with the ball nut and the torque transfer tube; and, a ball screw extending through at least a portion of the motor shaft and through the torque transfer tube and the ball nut and outward from the housing, the ball screw configured for movement along the axis in response to rotation of the ball nut wherein a first radially extending surface formed in an axial end of one of torque transfer tube and the first coupling faces a second radially extending surface of the other of the torque transfer tube and the first coupling and the first and second radially extending surfaces are axially spaced from one another by an air gap.

12. The linear actuator of claim 11, further comprising and an angular contact bearing disposed between the housing and the first coupling, the angular contact bearing and first coupling disposed in a radial plane extending perpendicular to the axis.

13. The linear actuator of claim 11 wherein the ball screw extends through an entire length of the motor shaft.

14. The linear actuator of claim 11, further comprising a bushing disposed within the motor shaft and supporting a first axial end of the ball screw.

15. The linear actuator of claim 11, further comprising a brake disposed within the housing and configured to apply a braking torque to the motor shaft.

16. The linear actuator of claim 15 wherein the motor shaft includes first and second axial ends, the first axial end of the motor shaft coupled to the first axial end of the torque transfer tube and the brake disposed about the second axial end of the motor shaft.

17. The linear actuator of claim 15 wherein the ball screw extends through at least a portion of the brake.

18. The linear actuator of claim 11, further comprising a bellows having a first end coupled to the housing and a second end coupled to the ball screw.

19. The linear actuator of claim 18 wherein the first end of the bellows and the ball nut are disposed in a radial plane extending perpendicular to the axis.

20. The linear actuator of claim 11, further comprising a second coupling between the first axial end of the torque transfer tube and the motor shaft, the second coupling configured for rotation with the motor shaft and the torque transfer tube.

* * * * *